(12) United States Patent
Auber

(10) Patent No.: US 6,996,337 B2
(45) Date of Patent: Feb. 7, 2006

(54) ELECTRICALLY HEATABLE LIQUID LINE

(75) Inventor: Heiko Auber, Eschbronn-Mariazell (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/949,008

(22) Filed: Sep. 24, 2004

(65) Prior Publication Data
US 2005/0063689 A1    Mar. 24, 2005

(30) Foreign Application Priority Data
Sep. 24, 2003   (DE)  ............................... 103 44 137

(51) Int. Cl.
*F24H 1/10* (2006.01)
(52) U.S. Cl. ...................................... 392/480; 219/534
(58) Field of Classification Search ................ 392/472, 392/473, 476, 465, 468, 478, 479, 480; 219/534, 219/536
See application file for complete search history.

(56) References Cited

U.S. PATENT DOCUMENTS 4,455,474 A *  6/1984  Jameson et al. ............. 392/472
6,738,566 B2 *  5/2004  Pagnella ...................... 392/472

FOREIGN PATENT DOCUMENTS

| DE | 1675407 | 1/1971 |
|----|---------|--------|
| DE | 2813824 | 10/1979 |
| DE | 8713072 | 1/1989 |
| DE | 197 28 942 A1 | 1/1999 |
| DE | 101 07 570 A1 | 9/2002 |
| EP | 1125810 | 8/2001 |
| EP | 1329660 | 7/2003 |
| FR | 925461 | 3/1947 |
| WO | 9428694 | 12/1994 |

* cited by examiner

*Primary Examiner*—Thor S. Campbell
(74) *Attorney, Agent, or Firm*—Friedrich Kueffner

(57) ABSTRACT

An electrically heatable liquid line in which a heating wire is arranged on an inner plastic layer and an electrically insulating tape is helically wound around the plastic layer and the heating wire. This object is met in the liquid line of the above-type by providing the insulating tape as an adhesive tape whose adhesive can be glued to the plastic layer.

5 Claims, 1 Drawing Sheet

ELECTRICALLY HEATABLE LIQUID LINE

BACKGROUND OF THE INVENTION

1. Field of the Invention

The present invention relates to an electrically heatable liquid line in which a heating wire is arranged on an inner plastic layer and an electrically insulating tape is helically wound around the plastic layer and the heating wire.

2. Description of the Related Art

The preferred field of application of the liquid line are urea, for example, so-called "AdBlue", which are injected for the aftertreatment of the waste gas of diesel-operated vehicles into the exhaust gas line in order to reduce toxic $NO_x$ components into normal components of the air, i.e., nitrogen, water and carbon dioxide. However, the liquid line is also suitable for diesel fuels, water, such as cooling or washing water, or brake oil in motor vehicles. By heating the liquid line, freezing of the urea, the diesel fuels or the water can be prevented and/or preheating of the diesel fuels can be achieved.

In a known commercially available liquid line of the above-described type, the plastic layer and the tape are of rubber, and the tape is vulcanized onto the rubber layer after an additional reinforcement fabric has been placed between the two components in order to prevent an expansion of the liquid line at high pressures.

The vulcanizing procedure is time-consuming and energy-consuming and, therefore, is expensive.

SUMMARY OF THE INVENTION

The object of the present invention is to provide a liquid line of the above-described type whose manufacture is simpler.

In accordance with the present invention, this object is met in the liquid line of the above-type by providing the insulating tape as an adhesive tape whose adhesive can be glued to the plastic layer.

The solution according to the present invention makes it possible that the adhesive tape can be wound onto the plastic layer in a simple manner, for example, by means of an automatic winding machine or even by hand, or possibly by means of a simple winding device. In accordance with a preferred feature, the adhesive tape includes a textile strip which is coated on one side thereof with adhesive. Such an adhesive tape has a high tensile strength and can therefore be wound very tightly. Moreover, the side of the tape facing outwardly after winding is not adhesive.

The heating wire can be wound helically or spirally around the plastic layer. Because of the resulting spatial concentration, the heating power of the surface area is relatively high, so that the liquid is quickly heated even if the heating power is relatively low, when the tape is not wound up. The high heating power per surface area can also be achieved by winding the heating wire around the plastic layer in the form of a double helix and to provide the heating wire with an electrically insulating cover. Consequently, the adjacent wire sections can be arranged relatively closely next to each other without producing a short circuit.

The heating wire preferably forms a loop. The loop makes it possible to wind the forward and return lines of the heating wire in a simple manner simultaneously onto the plastic layer.

The ends of the heating wire are preferably connected to a plug. As a result, the heating wire can be connected in a simple manner to a voltage source.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
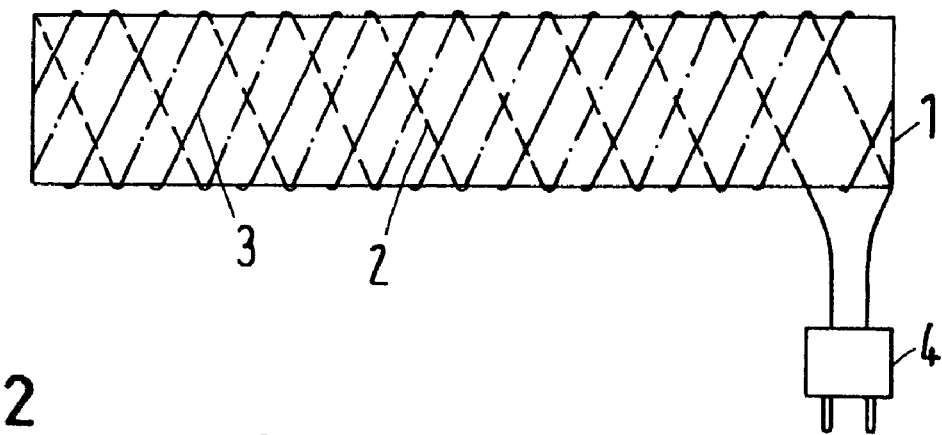
FIG. 1 is a side view of a first embodiment of the electrically heatable liquid line according to the present invention.
Figure 2:
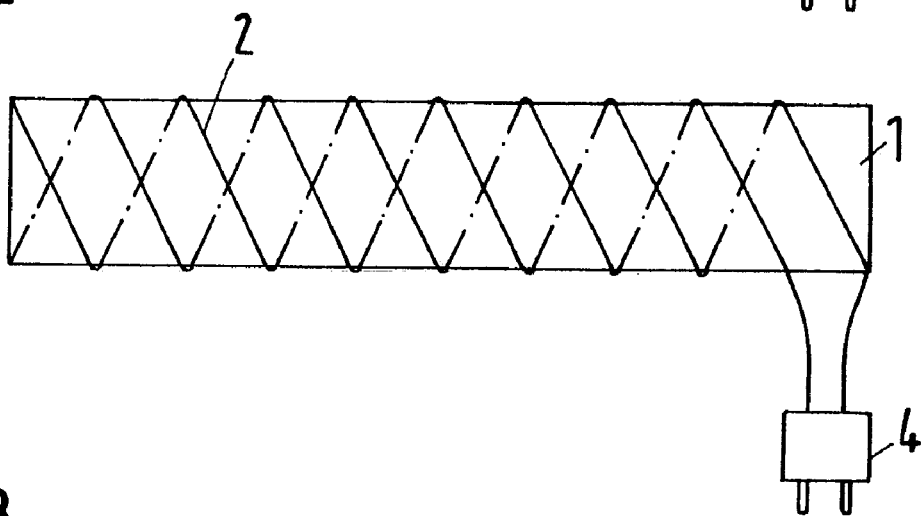
FIG. 2 is a side view of the liquid line of FIG. 1, shown without the adhesive tape which is wound onto the outside as shown in FIG. 1.
Figure 3:
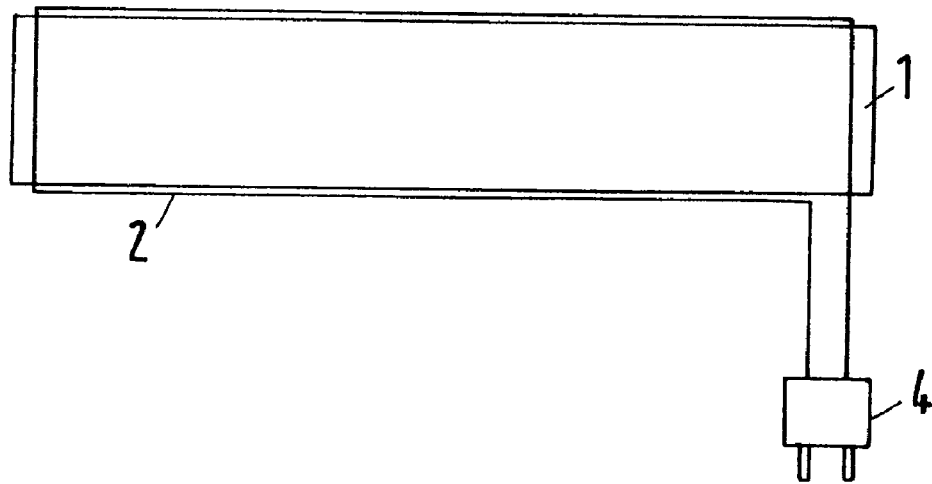
FIG. 3 is a side view of a second embodiment of the liquid line according to the present invention, wherein, for clarity's sake, the adhesive tape provided according to the present invention is omitted.

The liquid lines illustrated in FIGS. 1–3 have an inner tubular or hose-like flexible plastic layer 1 and a heating wire 2 in the form of a resistance wire arranged on the plastic layer 1. In both embodiments, an electrically insulating tape 3 is helically wound onto the plastic layer 1 and the heating wire 2. The tape 3 is not illustrated in FIGS. 2 and 3 in order to make it easier to recognize the pattern of the heating wire 2.

The insulating tape 3 is an adhesive tape whose adhesive can be glued to the plastic layer 1. The tape 3 includes a textile strip which is on one side thereof coated with adhesive; the textile strip provides the tape with a high tear resistance.

In the embodiment according to the FIGS. 1 and 2, the heating wire forms a loop which is wound helically in the form of a double helix onto the plastic layer 1.

In the embodiment of FIG. 3, the heating wire 2 also forms a loop whose forward and return lines extend straight on sides of the plastic layer 1 which face away from each other.

The heating wire 2 is provided with an electrically insulating coating or cover of plastic material, so that, in the embodiment of FIGS. 1 and 2 the forward and return lines can extend closely next to each other, while preventing a short circuit.

The helical pattern and the close vicinity of the heating wire sections to each other increase the heating power per surface unit of the plastic layer 1, so that the liquid flowing through the liquid line can be heated quickly.

The ends of the heating wire 2 are provided with a plug 4 which, in turn, can be plugged into a socket of a voltage source.

The configuration of the insulating tape 3 as an adhesive tape simplifies the manufacture of the liquid line as compared to a known liquid line in which the insulating tape is vulcanized onto the plastic layer 1. The adhesive tape can be wound onto the plastic layer 1 very simply and quickly. It is not necessary to carry out a subsequent vulcanizing step.

While specific embodiments of the invention have been shown and described in detail to illustrate the inventive principles, it will be understood that the invention may be embodied otherwise without departing from such principles.

I claim:

1. An electrically heatable liquid line comprising an inner plastic layer and a heating wire comprising an electrically insulating cover arranged directly on the inner plastic layer, and an electrically insulating tape helically wound directly onto the plastic layer and the heating wire, wherein the insulating tape is an adhesive tape, wherein the adhesive tape comprises a textile strip which is on one side thereof coated with an adhesive and wherein the adhesive of the adhesive tape is glued to the plastic layer.

2. The liquid line according to claim 1, wherein the heating wire is helically wound onto the plastic layer.

3. The liquid line according to claim 1, wherein the heating wire is wound in the form of a double helix onto the plastic layer.

4. The liquid line according to claim 1, wherein the heating wire forms a loop.

5. The liquid line according to claim 3, wherein the heating wire has ends, wherein the ends are connected to a plug.

* * * * *